March 27, 1951     A. G. ENANDER     2,546,665
BICYCLE COASTER BRAKE DISK ALIGNING TOOL
Filed Sept. 27, 1948
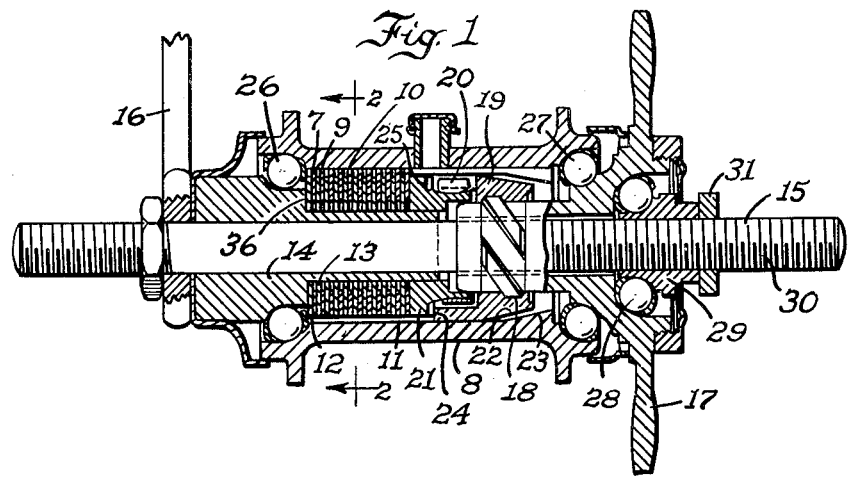
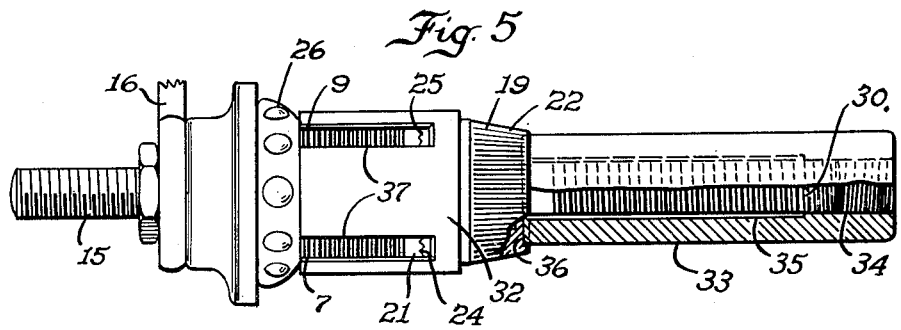
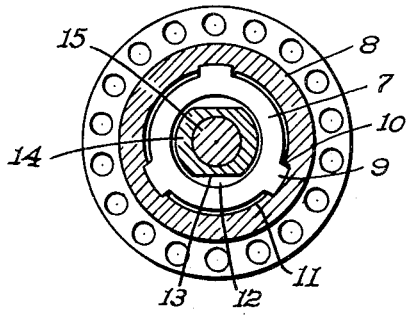
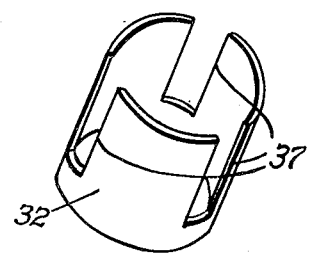
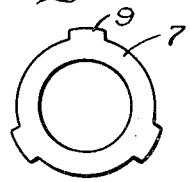
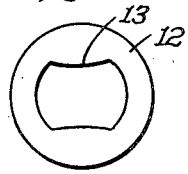
Inventor
Arthur G. Enander
Andrew F. Wintercorn
Atty Patented Mar. 27, 1951

2,546,665

UNITED STATES PATENT OFFICE 2,546,665

BICYCLE COASTER BRAKE DISK ALIGNING TOOL

Arthur G. Enander, Rockford, Ill., assignor to Smith & Enander, Beloit, Wis., a copartnership Application September 27, 1948, Serial No. 51,465

1 Claim. (Cl. 29—271)

This invention relates to a brake disk aligning tool especially designed and adapted for use by bicycle repairmen to facilitate reassembling coaster brakes, as for example, when worn and broken disks have been replaced, the tool being also useful, of course, in bicycle factories to facilitate such assembling in the first instance.

In the well known New Departure coaster brakes, the disks that turn with the hub of the rear wheel having radially projecting lugs adapted to fit in keyways provided in the bore of the wheel hub, these disks turning relative to intermediate stationary disks that are similarly splined to the fixed axle, all of the disks being crowded together more or less tightly for a friction braking action when the drive sprocket is turned slightly in a reverse direction, as is well known. Bearing in mind the fact that there are about a dozen of these rotatable brake disks and they are, of course, in closely spaced relation in the axle assembly, it goes without saying that it is a tedious and time consuming job to thread the lugs on these closely spaced disks one by one into their keyways in the wheel hub when assembling the wheel onto the axle. Hand nuts have been used for application to the axle temporarily to hold the disks and other interval working parts of the coaster brake in clamped relationship while the axle assembly is being entered into the wheel hub, but even so the rotatable disks presented a problem because of the difficulty first of all in accurately aligning the lugs on these disks by hand and thereafter keeping them accurately aligned until the hand nut is tightened to clamp the disks, the slightest misalignment of any lugs being enough to interfere with their entry in the keyways, all of which can be very annoying and irritating to a workman especially when he is in a hurry, as is usually the case, considering the volume of work to be done in a busy bicycle repair shop. It is, therefore, the principal object of my invention to provide a novel disk aligning tool which when used in conjunction with the hand nut avoids all of the difficulties mentioned and enables much quicker assembling even by relatively inexperienced and unskilled workmen.

The invention is illustrated in the accompanying drawing in which—

Fig. 1 is a longitudinal section in a horizontal plane through a New Departure bicycle coaster brake completely assembled, this view being considered necessary for a better understanding of my invention;

Fig. 2 is a cross-section on line 2—2 of Fig. 1;

Fig. 3 is a face view of one of the rotatable brake disks that turn with the wheel hub;

Fig. 4 is a face view of one of the stationary brake disks that are fixed relative to the axle;

Fig. 5 is a view partly in section and mostly in elevation of the preliminary brake assembly in which the disk aligning tool of my invention is shown in use on the lugs of the rotatable disks to align them and hold the same in such alignment while the hand nut is applied and tightened, and Fig. 6 is a perspective view of the disk aligner.

The same reference numerals are applied to corresponding parts throughout these views.

Referring to the drawing, the disks 7 are the ones that turn with the hub 8 of the rear wheel, these having lugs 9 spaced 120° apart projecting radially therefrom and fitting in keyways 10 provided in the bore 11 of the hub. These disks are evenly spaced and turn relative to intermediate stationary disks 12 that are splined, as at 13, on a sleeve or mandrel 14 fixed with respect to the axle 15, this sleeve 14 being the stationary part from which the familiar radius arm 16 extends for fastening in the well known way to the frame on one side of the rear fork to prevent its turning under the application of heavy braking torque. 17 is the drive sprocket which has an integral tubular screw threaded hub projection 18 which threads in the collar 19 so that when the sprocket is turned forwardly in the usual way, the collar 19, being slidably keyed, as at 20, to the collar 21 non-rotatably slidably fitted on the flats 13 of sleeve 14, will be moved to the right to drivingly engage its tapered, and preferably also serrated, end portion 22 in the tapered end 23 of the bore 11 in the hub 8, whereby to transmit drive to the wheel, the key 20 being on a spring clip ring frictionally but rotatably fitted on the reduced end portion of collar 21 so as to be free to turn with the collar 19 and hub 8. When some forward drive has been transmitted in the manner described and the rider desires to coast he merely stops pedaling, and, when that occurs, the hub 8 turns collar 19 with it in a forward direction enough to free it and the wheel then runs freely. However, when the sprocket 17 is turned in the reverse direction, by rearward pressure on the pedals, in the well known way, the collar 19 is moved to the left and interengages its clutch teetr 24, provided on the end thereof, with clutch teeth 25 provided on collar 21 and, the two collars, being now locked together, move to the left as a unit and press the disks 7 and 12 into tight frictional engagement for a good braking action, the tightness of engagement being, of course, dependent upon how heavy rearward pressure is applied to the pedals. So much for the construction and mode of operation of the type of coaster brake with which my invention is particularly concerned, namely, the multiple disk type. In passing, it will be seen that the collar 14 provides thereon one raceway for the ball bearing 26 for the anti-friction bearing support of one end of the hub 8 in which the companion raceway is provided, as shown. Also, that ball bearing 27 supporting the other end of the hub has one raceway in that end of the hub and the companion raceway on the hub portion of sprocket 17, the latter being in turn supported on another ball bearing 28 for which one raceway is provided in the hub of sprocket 17 and the other raceway on a cone bearing nut 29 adjustable on the threads 30 on axle 15 and locked by a jamb nut 31 in its adjusted position.

Fig. 5 illustrates my invention, this view showing in connection with the disk aligning tool 32 of my invention the preliminary or subassembly for the coaster brake of Fig. 1, consisting of the axle 15 with the multiple disk assembly 7—12 thereon, including collars 19 and 21, and also bearing 26, the disks and other parts shown being retained on axle 15 and clamped tightly by a long hand nut 33 which has only a short outer end portion 34 of its bore 35 reduced and threaded for quick threading on and removal from the threaded end 39 of the axle. The nut 33 has abutment in the recessed end 36 of the collar 19 as shown and serves to press the collars 19 and 21 against the stack of brake disks 7 and 12, packing them against the shoulder 36 on sleeve 14, and, in accordance with my invention, the tool 32, being tubular in form, with approximately the same internal diameter as the bore 11 of the wheel hub 8 is adapted to be slipped over the sub-assembly onto the stack of brake disks 7—12, entering lugs 9 in the parallel longitudinal slots 37 with a close working fit, these slots 37 being of the same width, and spaced the same angularity (120°), as the keyways 10 in the wheel hub 8. The lugs 9 will, of course, first be in a haphazard array and the nut 33 must, therefore, be loosened enough to allow the disks to be turned with the sleeve 32 as the lugs on one after another of the disks 7 enter the slots 37, the sleeve being continuously pressed forward and turned by hand back and forth to bring the slots into register with the lugs. Inasmuch as this is all done before the assembly shown in Fig. 5 is inserted in the wheel hub, with lugs 9 and slots 37 fully exposed so that the workman can see what he is doing, as distinguished from assembling the coaster brake the old way, in which the workman found plenty of difficulty working the lugs 9 of one after another of disks 7 directly into keyways 10, while the lugs were hidden from view inside the hub with the keyways, it goes without saying that there is an appreciable saving in time and work. After the lugs 9 on the whole set of rotatable disks 7 have been gathered in alignment in the slots 37 in this manner the hand nut 33 is tightened again to clamp the disks in their accurate alignment, so that the sleeve 32 can then be removed to permit entering the sub-assembly in the bore 11 of hub 8. The accurately aligned lugs 9 enter the keyway 10 without any difficulty whatsoever. Nut 33 is then removed and bearing 27 is assembled in the end of hub 8, and after that sprocket 17 is slipped over axle 15 and its threaded projection 18 is threaded into nut 19. Bearing 28 is usually previously assembled in sprocket 17 so that there remains only the assembling of cone bearing nut 29 and its jamb nut 31 on the axle to complete the assembly of Fig. 1.

It is believed the foregoing description conveys a good understanding of the objects and advantages of my invention. The appended claim has been drawn to cover all legitimate modifications and adaptations.

I claim:

As an article of manufacture, a disk aligning tool for the multiple brake disks of a bicycle coaster brake, certain of which disks have three radially projecting lugs spaced circumferentially 120° adapted to fit in keyways in a bicycle wheel hub, said tool comprising an elongated tubular body of suitable material having a bore of uniform diameter from end to end substantially equal to the diameter of the bore of the wheel hub in which the coaster brake is destined to be assembled, whereby said tubular body is adapted to fit over the peripheries of the brake disks, said tubular body having three parallel longitudinally extending elongated slots provided therein, all opening from one end of said body, said slots being of a width substantially equal to that of the lugs and the keyways in the wheel hub and being spaced circumferentially 120° the same as both, whereby said slots are adapted to slidably receive therein and thereby align the lugs on said disks.

ARTHUR G. ENANDER.

REFERENCES CITED

The following references are of record in the file of this patent:

UNITED STATES PATENTS

| Number | Name | Date |
|---|---|---|
| 903,818 | Herth | Nov. 10, 1908 |